April 15, 1958     H. J. DUDENHAUSEN     2,831,154
ROTARY CURRENT-INVERTER FOR THREE-PHASE MOTORS
Filed Feb. 4, 1954

*INVENTOR.*
Hans Jurgen Dudenhausen
BY
Pennie, Edmonds, Morton, Barrows & Taylor
*ATTORNEYS*

United States Patent Office 2,831,154
Patented Apr. 15, 1958

2,831,154

ROTARY CURRENT-INVERTER FOR THREE-PHASE MOTORS

Hans Jürgen Dudenhausen, Stuttgart, Germany, assignor to Intavex, Inc., New York, N. Y., a corporation of New York Application February 4, 1954, Serial No. 408,134

Claims priority, application Germany June 30, 1953

3 Claims. (Cl. 318—231)

My invention relates to a rotary pulse current-inverter.

In order to drive three-phase motors, for instance induction motors with squirrel-cage rotors, converters are required if these motors are to be operated from a D. C. network. This is for instance the case in driving gyro instruments in airplanes, the gyros of which are generally constructed for squirrel-cage rotor induction motors, whereas there is frequently available in the airplane only a direct current network of 22–27 volts, the voltage of which is subject to substantial fluctuations. The power consumed by the induction motors of gyroscopic devices is small and amounts only to a few watts. Three-phase current frequency is today generally standardized (400 cycles) and must be approximately constant, corresponding to the operating conditions of gyroscopic devices. The direct current to three-phase generator converters known today are heavy in weight, large in volume and poor in efficiency on account of the small three-phase power and the high three-phase frequency (400 cycles) required which is very unfavorable for use in airplanes. Operation of induction motors by phase-displaced direct current pulses which are produced by a chopper with capacitor phase shifting has been tried. These types of converters are not, however, very stable due to their high frequency, and their aging qualities are not very satisfactory.

The object of the present invention is a converter which, with minimum weight and volume and high efficiency, makes it possible to drive three-phase current induction motors from a direct current network. The invention proceeds from the known fact that induction motors can be operated by chopped phase-shifted direct current.

In accordance with the present invention, the phase-shifted direct current pulses are taken from the brushes of a direct current motor having a permanent magnet which rotates between three electromagnets which are alternately fed via a commutator, and the pulses so taken are fed to the three windings of a Y-connected induction motor.

My invention will be further described by reference to the accompanying drawings of which:

Figure 1:
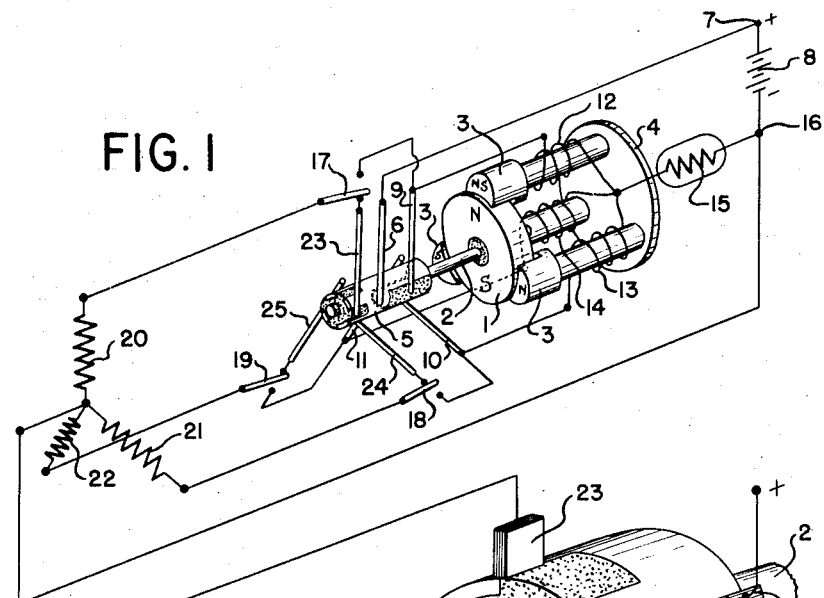
Fig. 1 shows the mechanical and electrical construction of the new converter in principle.

A permanent magnet 1 is arranged for rotation on a shaft 2 between three electromagnets 3, arranged 120° apart. The electromagnets 3 are fastened to the iron plate 4. A commutator 5 is fastened with its conducting segment insulated from the shaft 2. A sliding contact or brush 6 is connected via the terminal 7 with the positive pole of a current source, for instance the battery 8. The three brushes 9, 10, 11 thus feed current to the windings 12, 13, 14 arranged on the magnets 3. The ends of the windings 12, 13, 14 are connected with the negative terminal 16 of the current source 8 via an iron-hydrogen resistance 15. The windings 12, 13, 14 are wound in the same direction so that upon energization thereof via the brushes 9, 10 and 11 the poles of the electromagnets 3 between which the magnet 1 rotates will be magnetized in the same polarity. With the spatial arrangement of the stationary brushes 9, 10, 11 and of the commutator 5 shown, in the position of the permanent magnet 1 and of the commutator 5 shown in the drawing the winding 14 is under voltage while there is no current in the winding 13. The spatial position of the brush 9 is so selected that it rests on the place of transition from the conducting commutator segment to the insulated commutator segment shown in dotted line. Corresponding to the direction of winding of the coil 14 shown in the drawing, a south pole is produced at the corresponding magnet while on the magnet which is surrounded by the coil 13 a north pole is formed. Depending on the accuracy with which the brush 9 is set, current flows or does not flow through the coil 12 in the position of armature 1 shown in the drawing so that a south or north pole is developed on the corresponding magnet. The permanent magnet 1 is therefore turned in counterclockwise direction and rotates continuously inasmuch as the coils 12, 13, 14 are alternately under voltage via the brushes 9, 10, 11 and the commutator 5. The speed of rotation of armature is proportional to the voltage of the source 8 inasmuch as the permanent magnet 1 induces a voltage $EMK = U - I.R_a$ in the coils 12, 13, 14, U being the terminal voltage of the source 8, $R_a$ being the ohmic resistance of the individual windings 12, 13, 14 and I being the current flowing in the individual windings 12, 13, 14.

The electric motor comprising permanent magnet 1, electromagnets 3 and commutator 5 shown in Fig. 1 therefore has the characteristic of a direct current shunt-wound motor. Between the brush 6 serving as current feed and the brushes 9, 10, 11 there can be connected separate condensers having series-connected protective resistances in order to reduce the disruptive voltages which disturb the commutator 5 and the brushes 9, 10, 11.

The operating point of the iron-hydrogen resistance 15 is so selected that, for instance, with a voltage variation of the 24-volt battery 8 of ± 3 volts, the current flow through the coils 12, 13, 14 remains constant. By suitable design of the coils 12, 13, 14 the speed of rotation of the motor for this current may be made, for example, 6000 R. P. M. The speed of rotation will therefore remain constant even in case of voltage variations of the battery 8 of ±3 volts, provided that the mechanical torque taken from the motor is not changed, which is the case when the motor is used to drive the rotor of a gyroscope.

Figure 3:
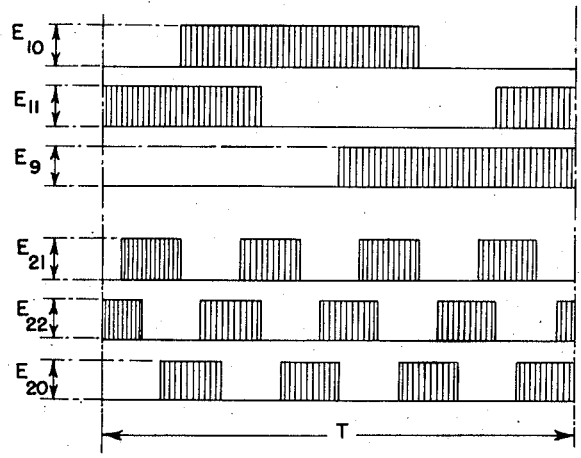
Fig. 3 shows the potential pattern developed by operating the system of Fig. 1.

Fig. 3 shows for one revolution T of the commutator 5 the potential $E_9$, $E_{10}$, $E_{11}$ prevailing between the brushes 6 and 9, 10, 11. If the switches 17, 18, 19 are moved by hand from the position shown in Fig. 1 onto the brushes 9, 10, 11, the voltages prevailing between the brushes 6 and 9, 10, 11 will also be present on the windings 20, 21, 22 of the Y-connected induction motor which is developed in this case for instance as a squirrel-cage rotor. Corresponding to the form of the voltages in the windings 20, 21, 22 as shown in Fig. 3, a rotating field will be induced in the squirrel-cage rotor so that it turns with a speed of revolution which, reduced by slip, corresponds to the speed of revolution of the direct current motor with its commutator 5 and, therefore, in the above example, to a speed of approximately 6000 R. P. M.

Figure 2:
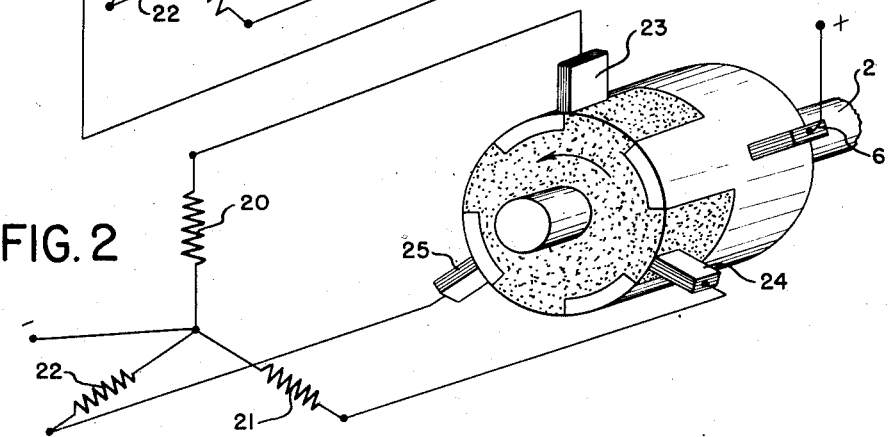
Fig. 2 shows in perspective an enlarged diagrammetric view of the commutator of Fig. 1.

Three further brushes 23, 24, 25, also staggered by 120°, slide on a second portion of the commutator 5 which, as shown on an enlarged scale in Fig. 2, is cut into four segments, each staggered by 90° from each other. Between the brushes 6 and 23, 24, 25 there now prevails, upon one revolution of the commutator 5, the voltages $E_{20}$, $E_{21}$, $E_{22}$, shown in Fig. 3. If, now, by shifting the switches 17, 18, 19, these voltages are connected to the windings 20, 21, 22 of the induction motor, the rotary field produced in the squirrel-cage armature will rotate four times as rapidly as the commutator 5. In our example, therefore, the induction motor will rotate with a speed of 4×6000 R. P. M. or 24,000 R. P. M.

Between the brushes 6 and 23, 24, 25 there may be connected separate capacitors with series resistance in order to eliminate the disturbing effect of the voltages induced upon disconnection of the coils 20, 21, 22.

As shown by the drawing of the rotor system 1, 2, 5, the commutator consists of a hard-silver tube of about 3 mm. outer diameter which is slit in the manner shown in the drawing and connected by means of molding compound (Bakelite resin) concentrically with the shaft 2 and with the armature comprising the transversely magnetized round disk magnet 1. In one example, the spatial dimensions of the converter were approximately half as large as shown in Fig. 1 and their weight was about 50 grams. The power absorbed by the coil system 12, 13, 14 and the iron-hydrogen resistance 15 amounted to a total of about 1 watt, while, via the brush systems 6 and 9, 10, 11 and 6 and 23, 24, 25 respectively, there could be taken to two separate induction motors separate amounts of 10 watts, if necessary simultaneously, so that the efficiency of this converter was from 90 to 95%.

I claim:

1. A machine adapted to develop from a direct current source three series of unidirectional voltage pulses, said machine comprising a first magnet mounted for rotation about an axis transverse to its polar axis, a commutator coupled to said magnet, said commutator having at one axial position a single conducting segment and at a second axial position an even number of evenly spaced conducting segments, a first set of three brushes engaging said single commutator segment at points substantially 120° apart on the path thereof, three electromagnets having each a winding and having each a pole disposed adjacent the path of the poles of said first magnet at points substantially 120° apart on said path, means interconnecting the other poles of said electromagnets by paths of low reluctance, a connection between each of said first brushes and a terminal of one of said windings, means to apply a direct current potential difference continuously between said commutator and the other terminals of said windings, and a second set of three brushes engaging said commutator at the second axial position thereof at points substantially 120° apart, said windings being so oriented that upon energization thereof via said first brushes the poles thereof adjacent the path of the poles of said first magnet are magnetized in the same polarity.

2. In combination, a three-phase induction motor having three Y-connected stator windings, and means to energize said windings from a source of direct current potential difference with three phase-displaced series of unidirectional voltage pulses, said means comprising a first magnet mounted for rotation about an axis transverse to its polar axis, a commutator coupled to said magnet, three brushes engaging said commutator at points substantially 120° apart, three electromagnets having each winding and having each a pole disposed adjacent the path of the poles of said first magnet at points substantially 120° apart on said path, means interconnecting the other poles of said electromagnets by paths of low reluctance, connections between each of said brushes and a terminal of one of said electromagnet windings, means to apply a direct current potential difference between said commutator and the other terminals of said electromagnet windings, a connection between each of said brushes and one of said stator windings, and a connection betwen the common junction of said stator windings and said other terminals of said electromagnet windings.

3. In combination, a three-phase induction motor having three Y-connected stator windings, and means to energize said windings from a source of direct current potential difference with three phase-displaced series of unidirectional voltage pulses, said means comprising a first magnet mounted for rotation about an axis transverse to its polar axis, a commutator coupled to said magnet, said commutator having at one axial position a single conducting segment and at a second axial position an even number of evenly spaced conducting segments, a first set of three brushes engaging said single commutator segment at points substantially 120° apart on the path thereof, three electromagnets having each a winding and having each a pole disposed adjacent the path of the poles of said first magnet at points substantially 120° apart on said path, means interconnecting the other poles of said electromagnets by paths of low reluctance, a connection between each of said first brushes and a terminal of one of said electromagnet windings, means to apply a direct current potential difference continuously between said commutator and other terminals of said electromagnet windings, a second set of three brushes engaging said commutator at the second axial position thereof at points substantially 120° apart, a connection between each of said second brushes and one of said stator windings, and a connection between the common junction of said stator windings and said other terminals of said electromagnet windings, whereby for every revolution of said commutator there are applied to each of said stator windings as many unidirectional pulses as there are conducting segments on the said commutator at said second axial position thereon.

References Cited in the file of this patent

UNITED STATES PATENTS

| | | |
|---|---|---|
| 2,038,960 | Schattanik | Apr. 28, 1936 |
| 2,325,142 | Lodge | July 27, 1943 |
| 2,454,519 | McNaney | Nov. 23, 1948 |
| 2,659,852 | Trevitt | Nov. 17, 1953 |

FOREIGN PATENTS

| | | |
|---|---|---|
| 867,567 | Germany | Feb. 19, 1953 |